US00RE45166E

(19) United States
(12) Reissued Patent
Luo et al.

(10) Patent Number: US RE45,166 E
(45) Date of Reissued Patent: Sep. 30, 2014

(54) REMOTE KEYLESS ENTRY SYSTEM WITH TWO-WAY LONG RANGE COMMUNICATION

(71) Applicant: Lear Corporation, Southfield, MI (US)

(72) Inventors: Yi Luo, Northville, MI (US); Riad Ghabra, Northville, MI (US); Qingfeng (Tom) Tang, Novi, MI (US)

(73) Assignee: Lear Corporation, Southfield, MI (US)

(21) Appl. No.: 13/951,534

(22) Filed: Jul. 26, 2013

Related U.S. Patent Documents

Reissue of:

(64) Patent No.: 8,026,793
Issued: Sep. 27, 2011
Appl. No.: 10/960,657
Filed: Oct. 7, 2004

(51) Int. Cl.
*H04Q 1/00* (2006.01)

(52) U.S. Cl.
USPC ..... 340/5.72; 340/5.61; 340/426.36

(58) Field of Classification Search
USPC ..... 340/5.72, 5.61, 426.13, 426.1, 426.18, 340/426.16, 426.36; 370/504; 375/254, 375/297; 341/176; 455/127.5
See application file for complete search history.

(56) References Cited

U.S. PATENT DOCUMENTS

| | | | |
|---|---|---|---|
| 5,311,516 | A | 5/1994 | Kuznicki et al. |
| 5,539,645 | A | 7/1996 | Mandhyan et al. |
| 5,721,783 | A | 2/1998 | Anderson |
| 5,805,063 | A | 9/1998 | Kackman |
| 6,294,992 | B1 | 9/2001 | Addy et al. |
| 6,556,135 | B2 | 4/2003 | Attring et al. |
| 6,724,322 | B2 | 4/2004 | Tang et al. |

FOREIGN PATENT DOCUMENTS

| | | |
|---|---|---|
| GB | 2240418 | 7/1991 |
| GB | 2240418 A | 7/1991 |

*Primary Examiner* — Edwin Holloway, III
(74) *Attorney, Agent, or Firm* — Brooks Kushman P.C.

(57) ABSTRACT

Vehicle information (e.g., status information, calibratable parameters, or diagnostic data) is transmitted from a base station mounted in a vehicle to a portable RKE fob via a radio-frequency signal within a specified average field strength limit. A multi-byte vehicle message is formed and then coded into a multi-bit coded message. The multi-bit coded message is framed into a plurality of packets. The radio-frequency signal is wirelessly transmitted from the base station with a plurality of spaced packet windows having a predetermined duty cycle, each packet window including a respective one of the plurality of packets. The radio-frequency signal within each of the packet windows has a predetermined field strength greater than the average field strength limit and a substantially zero field strength between the packet windows. The predetermined duty cycle results in an actual average field strength for transmitting all of the packets not exceeding the average field strength limit.

14 Claims, 2 Drawing Sheets

REMOTE KEYLESS ENTRY SYSTEM WITH TWO-WAY LONG RANGE COMMUNICATION

Matter enclosed in heavy brackets [ ] appears in the original patent but forms no part of this reissue specification; matter printed in italics indicates the additions made by reissue.

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to remote keyless entry systems for motor vehicles, and, more specifically, to increasing transmission range between a vehicle base station and a handheld portable transceiver fob without exceeding regulatory average field strength limitations.

Remote keyless entry (RKE) systems for use with motor vehicles are well known in the art. Such systems typically include at least one remote control device, which typically takes the form of a key fob. The key fob includes a wireless transmitter for use by the vehicle owner or user to transmit wireless, usually radio frequency (RF), vehicle device function signals and includes a number of vehicle function buttons for use in transmitting such signals. A receiver and controller are typically provided in the vehicle for receiving the vehicle device function signals and controlling one or more vehicle devices in order to effect the desired vehicle function.

Vehicle devices which have been remotely controlled in such a fashion include door lock mechanisms, a vehicle trunk, interior and/or exterior vehicle lights, and a vehicle horn or other alarm. More recently, remote vehicle starting (sometimes together with remote temperature control) has been introduced. Prior RKE systems have typically utilized one-way transmissions from the portable fob to the vehicle. However, two-way communication systems are increasingly being used to facilitate user feedback for remote starting functions (e.g., reminders that a vehicle is running, and providing a remote indication of the vehicle temperature that has been achieved) and for providing guiding information as part of a vehicle locating system, for example. A two-way RICE system is shown, for example, in U.S. Pat. No. 6,724,322, entitled "Remote System For Providing Vehicle Information To A User," issued to Tang et al. on Apr. 20, 2004, incorporated herein by reference.

A key fob must be small in size in order to facilitate carrying in a user's pocket or purse. Thus, miniaturized circuits and a small battery size are employed. Energy efficient microelectronic circuits and methods of operation are necessary in order to minimize battery consumption and maximize battery life. The key fob must also accommodate a transmit/receive antenna that is preferably hidden within the key fob because of esthetic and durability concerns. Therefore, the antenna gain that can normally be achieved is fairly low. The low antenna gain has constrained the operating range over which broadcasts between the portable fob and the vehicle base station can be reliably received.

One method to increase effective range would be to increase the transmitter power. However, government regulations aimed at reducing the likelihood of interference with other transmissions are in place which limit the allowed transmitter power. Prior art transmitters have operated near the regulatory limits and yet operating range has been less than desired for remote monitoring of a vehicle, such as when the vehicle has been remotely started.

SUMMARY OF THE INVENTION

The present invention has the advantage of increasing operating range without modifications to the antenna and while operating within regulatory power limits.

In one aspect of the invention, a method is provided for transmitting vehicle information from a base station mounted in a vehicle to a portable RKE fob via a radio-frequency signal within a specified average field strength limit. A multi-byte vehicle message is formed and then coded into a multi-bit coded message. The multi-bit coded message is framed into a plurality of packets. The radio-frequency signal is wirelessly transmitted from the base station with a plurality of spaced packet windows having a predetermined duty cycle, each packet window including a respective one of the plurality of packets. The radio-frequency signal within each of the packet windows has a predetermined field strength greater than the average field strength limit and a substantially zero field strength between the packet windows. The predetermined duty cycle results in an actual average field strength for transmitting all of the packets not exceeding the average field strength limit. The plurality of packets are received within the portable RKE fob. The vehicle message is recovered in the RKE fob in response to the received plurality of packets.

DETAILED DESCRIPTION OF PREFERRED. EMBODIMENTS

Figure 1:
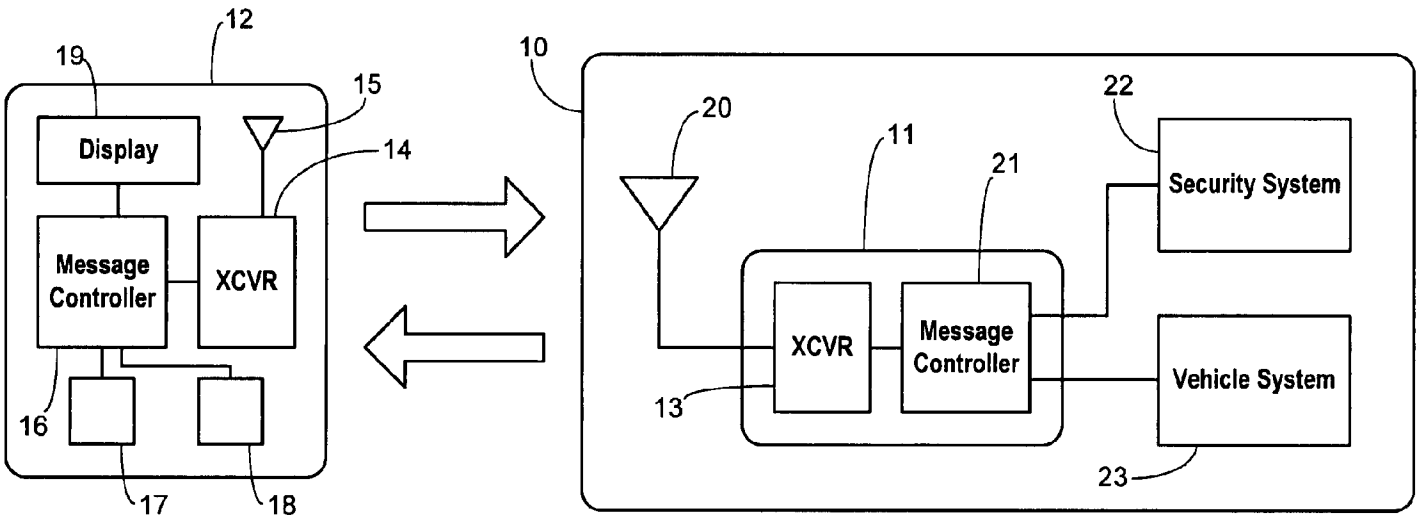
FIG. 1 is a block diagram showing the two-way communication system of the present invention.

RKE transmitters are regulated as intentional radiators. Most existing RKE systems operate at 315 MHz or at 433 MHz. Each particular transmitter design is certified, so that individual licenses are not necessary for their operation. In the United States, for example, the FCC regulates these remote control devices by imposing a field strength limitation for the fundamental frequency at 315 MHz of 6,040 microvolts per meter measured at 3 meters. Compliance with the limits on field strength may be demonstrated based on the average value of the measured emissions. Therefore, a peak signal strength greater than the specified field strength limit is permissible provided the average emissions are within the limits. The regulations providing for the field strength limitation are found in FCC regulations under Title 47, Part 15, Section 15.231. FCC rules further provide in Section 15.35 that when an average radiated emission limit is specified there is also a limit on peak emissions corresponding to 20 dB above the maximum permitted average limit.

The data contained in a typical message sent by an RKE fob to the vehicle base station includes a transmitter identifier and an operation code. The transmitter identifier may comprise an encrypted identification code generated using a rolling code algorithm, as is known in the art, to prevent interception and subsequent unauthorized access to a vehicle. The operation code identifies a desired vehicle function as determined by the particular push button pressed on the fob, such as unlocking the doors. The data is typically encoded in a return to zero signal pattern, such as Manchester encoding. A message protocol is utilized which typically defines a preamble (to allow the receiver to detect an incoming message and synchronize its clock), a start bit, and a data field having a prescribed number of bits. When the push button is held down on the RKE fob, the corresponding data message is broadcast all at once. A typical transmission may last about 60 milliseconds, for example.

The duty cycle of a transmitter is defined as the ratio of transmitter on time to the transmitter cycle time (i.e., the minimum time between transmissions). A typical transmitter cycle time may be greater than about one hundred milliseconds. Using Manchester coding, the transmitter on time is one-half during a transmission. Therefore, a typical duty cycle in the prior art is equal to about 20·log(30 mS/100 mS) or about 10.5 dB. Consequently, the prior art transmission could utilize peak field strength which was about 10 dB greater than the average field strength limit, but no higher.

The present invention provides a modified message protocol for optimizing transmissions to utilize peak field strength that takes full advantage of the allowable peak values above the specified average. Specifically, the present invention reduces the data rate by framing a particular message into a plurality of packets and then separately transmitting the packets utilizing a duty cycle that can preferably take full advantage of the difference between the peak limit and the average limit for field strength. The corresponding reduction in data rate is well worth the improved operating range since the additional delay of a few hundred milliseconds is hardly noticeable to the user. The range is additionally improved by using error control coding (e.g., Hamming code) which results in a range improvement of about 1 dB.

Referring now to FIG. 1, a motor vehicle 10 includes a remote keyless entry (RKE) module 11 for communicating with a portable RKE fob 12 carried by a user. Two-way radio frequency (RF) communication is achieved using a pair of transceivers 13 and 14 in module 11 and fob 12, respectively. Fob 12 further includes an antenna 15 connected to transceiver 14 which may take the form of a monopole antenna formed as a conductor trace on a printed circuit board within fob 12, for example. A message controller 16 is coupled to transceiver 14, push buttons 17 and 18, and a display 19. Message controller 16 preferably includes a programmed micro-controller responsive to push buttons 17 and 18 for generating either remote commands (e.g., door lock or unlock, engine start, etc.) or status request messages to be sent to vehicle module 11. Message controller 16 also recovers vehicle data from messages received from vehicle module 11 for presentation on display 19 (e.g., the engine running status or internal temperature of vehicle 10). Besides vehicle status, the vehicle message may provide calibratable parameters (e.g., a center frequency to be used for transmissions or a wake-up interval for monitoring for transmissions) or diagnostic information (e.g., received signals strength of messages). Display 19 may, for example, comprise an LCD display.

Transceiver 13 in vehicle module 11 is connected to an antenna 20 and a vehicle message controller 21. Antenna 20 may comprise a monopole antenna packaged within a wire bundle of the electrical system of vehicle 10. A greater antenna length and a higher antenna gain is achievable within vehicle 10 as compared with antenna 15 in fob 12.

Message controller 21 is coupled to a security system 22 and to a vehicle system 23 such as an engine control module or a climate control module, for example. Vehicle message controller 21 responds to messages from fob 20 received by transceiver 13 in order to validate a message and then act upon any corresponding vehicle actions to be taken. For example, security system 22 may comprise electronic door locks, which may either be locked or unlocked in response to a message decoded by message controller 21. In response to a status request message from fob 12, message controller 21 may access vehicle system 23 in identifying an appropriate response to be generated by message controller 21 for broadcasting to fob 12. Vehicle message controller 21 may also initiate transmissions to fob 12 in order to transfer calibratable parameters or diagnostic information without being requested by fob 12.

Figure 2:
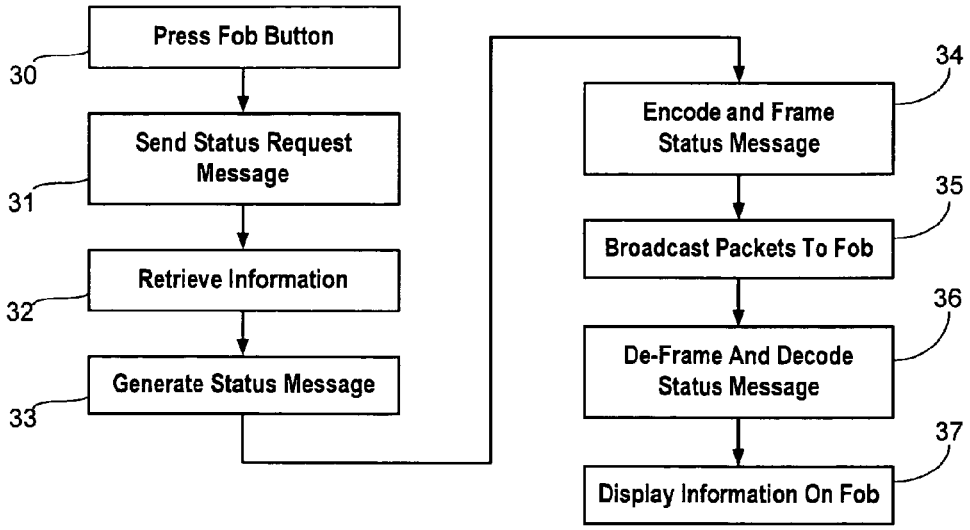
FIG. 2 is a flowchart showing a first preferred embodiment of a message sequence of the present invention.

A typical message sequence is shown in FIG. 2. In step 30, a user presses a fob button to request a particular vehicle status, such as the vehicle interior temperature or the running status of the engine, a vehicle alarm status for identifying a triggered alarm, or the locked or unlocked status of a particular vehicle door. A corresponding status request message is sent from the fob to the vehicle RKE module in step 31. The RKE module retrieves the appropriate information in step 32 and then generates a status message in step 33 according to a predefined message protocol. In step 34, the status message is encoded and framed into a plurality of packets, each packet containing a portion of the status message. The packets are broadcast to the fob in step 35 using a duty cycle selected to allow increased peak field strength to be utilized for broadcasting each packet. The status message is received by the fob and then deframed and decoded in step 36. In step 37, the information from the broadcast status message is displayed on the fob.

Figure 3:
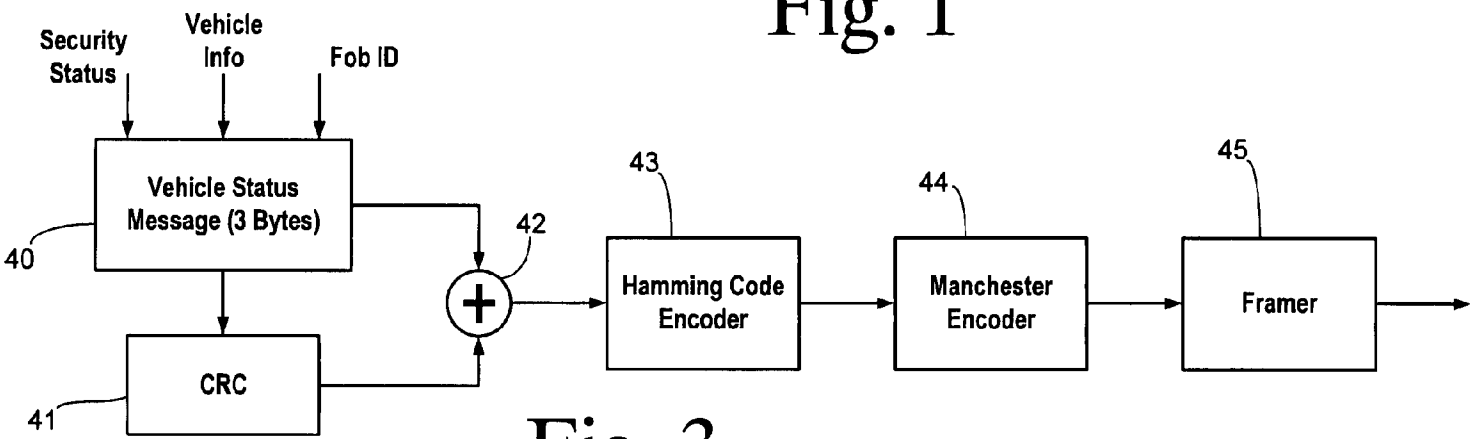
FIG. 3 is a block diagram showing a preferred embodiment for message assembly, encoding, and framing.

Functional blocks within the message controllers for generating the packets based on the data to be transmitted is shown in FIG. 3. A vehicle message (or a status request message) is assembled in a block 40 in response to a fob identifier and vehicle parameters such as a security status (e.g., alarms status or door lock status), vehicle information (e.g., engine running status or vehicle temperature), calibratable parameters, or diagnostic information. A typical vehicle status message may include 3 bytes wherein byte #1 includes vehicle security status, byte #2 includes vehicle temperature, and byte #3 includes a transmitter identifier. A vehicle message may preferably also include other bytes or message portions which include a fob ID code in a rolling code format. A one-byte cyclic redundancy check is calculated in a block 41 and added to the vehicle status message in a summer 42. To provide error correction as is known in the art, the four-byte message may be encoded using a hamming code in a block 43. A 7, 4 hamming code is preferably used. The multi-bit hamming result is provided to a Manchester encoder 44 for generating a multi-bit Manchester encoded message. Alternatively, any alternative non-return-to-zero encoding message or any other suitable bit encoding may be employed. A framer 45 separates the multi-bit coded message into a plurality of packets for separate transmission in spaced packet windows having a predetermined duty cycle. Each packet may preferably have a preamble and/or start bits prepended to it.

In a preferred example of the present invention having a status message including a CRC byte providing a total of 32 bits (i.e., four 8-bit bytes), application of a 7, 4 hamming coding produces 56 bits. The 56 bits are preferably broken into four separate packets including 13 data bits, 18 data bits, 18 data bits, and 7 data bits, respectively. The first packet begins with a preamble comprising a predetermined number of repetitions of a predetermined bit. The preamble is followed by a pair of start bits and then the data field for the first packet. Subsequent packets begin with the pair of start bits followed by their respective data bits. Each packet window may have a width of about 20 milliseconds and the packets may be repeated at a packet period of 100 milliseconds, resulting in a duty cycle of 10%. Using a data rate of about 2 kilobits per second during each packet, each bit period comprises about 0.5 milliseconds.

Figure 4:
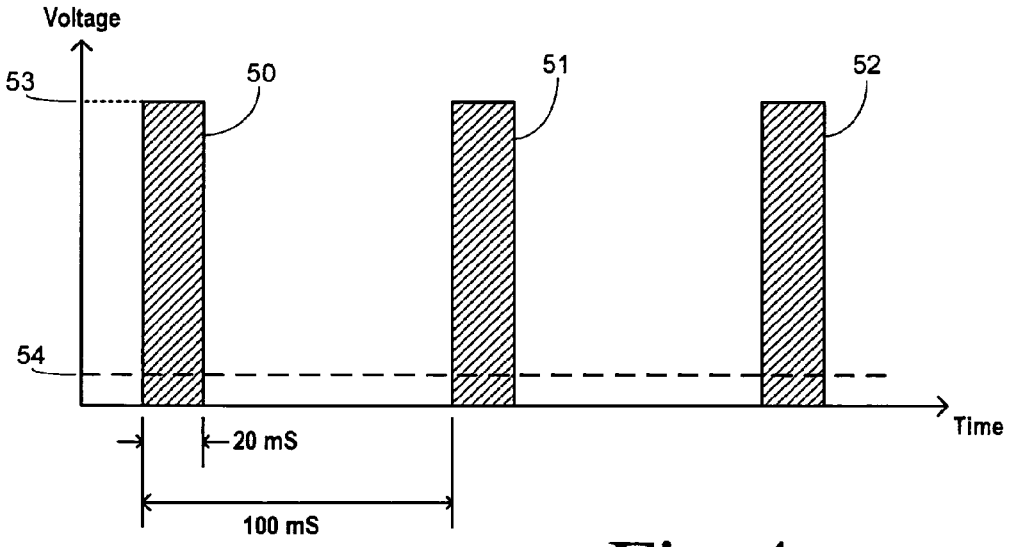
FIG. 4 is a waveform diagram showing the spaced packet windows and increased field strength transmissions of the present invention.

As shown in FIG. 4, packets 50, 51, and 52 have respective packet window widths of 20 milliseconds separated by a packet period of 100 milliseconds. Using Manchester coding, the transmitter is on during one-half of each 20 millisecond packet window. Each packet is transmitted with a peak field strength 53 greater than the specified average field strength limit 54. If the duty cycle (i.e., the ratio of half a packet window width to the packet period) is substantially equal to a reciprocal of the ratio of the peak field strength limit to the average field strength limit then the maximum allowable peak field strength limit is utilized. Thus, the transmission takes is full advantage of the permissible peak field strength to generate the greatest possible operating range. In the case of the FCC requirement that peak emission is limited to being 20 dB above the maximum permitted average limit, the peak field strength may be 10 times as great as the average field strength. Thus, at a duty cycle of 10%, the peak field strength is allowed to approach the maximum peak limit without reducing the data rate any more than necessary.

The packetized transmissions of the present invention can be used for either or both of the transmissions from the vehicle to the fob or from the fob to the vehicle. Since antenna gain and power consumption constraints in the vehicle are less severe than in the fob, the operating range for messages from the fob to the vehicle are less severely limited. Therefore, the present invention may be more beneficial when applied to messages being broadcast from the vehicle to the fob. In other words, greater receiver sensitivity may be more easily obtained in the vehicle receiver by achieving a greater antenna gain, reducing receiver bandwidth, and providing a higher amplifier gain in the vehicle receiver than are possible in the fob.

The fob ID shown in FIG. 3 is optional for insuring that a vehicle message is received by and displayed by only the fob requesting the information. The fob ID may comprise a random number generated by the fob and inserted into the vehicle status request message. The randomly generated number is received by the vehicle receiver and then included in the responsive vehicle message to be detected by the fob and correlated to the previous request message. A fob receiving the vehicle status message and not having a matching fob identifier in its memory would not display or otherwise use the vehicle message. A rolling code fob ID contains several bytes due to the large number of possible transmitters that are deployed in service. A short (e.g., one byte) fob ID is sufficient for restricting the reception of a vehicle message to the intended fob because the number of fobs within range of a vehicle is a much lower number.

What is claimed is:

1. A method of transmitting vehicle information from a base station mounted in a vehicle to a portable RKE fob via a radio-frequency signal within a specified average field strength limit, said method comprising the steps of:

forming a multi-byte vehicle message;

coding said vehicle message into a multi-bit coded message;

framing said multi-bit coded message into a plurality of packets, wherein each packet corresponds to a respective portion of said vehicle message;

wirelessly transmitting said radio-frequency signal from said base station with a plurality of spaced packet windows having a predetermined duty cycle, each packet window including a respective one of said plurality of packets, wherein said radio-frequency signal within each of said packet windows has a predetermined field strength greater than said average field strength limit and a substantially zero field strength between said packet windows, and wherein said predetermined duty cycle results in an actual average field strength for transmitting all of said packets not exceeding said average field strength limit;

receiving said plurality of packets within said portable RKE fob; and recovering said vehicle message in response to said received plurality of packets wherein said radio-frequency signal is transmitted within a specified peak field strength limit which is a predetermined decibel level above said average field strength limit, and wherein said predetermined duty cycle corresponds to said predetermined decibel level; and wherein said predetermined duty cycle has a ratio of one-half of a packet window width to a packet period which is substantially equal to a reciprocal of a ratio of said peak field strength limit to said average field strength limit.

2. The method of claim 1 wherein a ratio of said packet window width to said packet period is about one tenth.

3. The method of claim 1 wherein said vehicle message includes data indicative of a security alarm status.

4. The method of claim 1 wherein said vehicle message includes data indicative of a vehicle lock status.

5. The method of claim 1 wherein said vehicle message includes data indicative of a vehicle temperature status.

6. The method of claim 1 wherein said vehicle message includes data identifying said portable RKE fob for which said vehicle message is intended.

7. The method of claim 1 wherein said vehicle message is transmitted by said base station in response to a request message transmitted by said portable RKE fob.

8. The method of claim 7 wherein said vehicle message includes data identifying said portable RKE fob for which said vehicle message is intended, and wherein said data identifying said portable RKE fob is comprised of an identifying number previously transmitted from said portable RKE fob to said vehicle transmitter in said request message.

9. The method of claim 8 wherein said identifying number is generated as a random number by said portable RKE fob.

10. The method of claim 1 wherein a fob message is transmitted from said portable RKE fob to said base station according to the steps of:

coding said fob message into a multi-bit coded fob message;

framing said multi-bit coded fob message into a plurality of packets, wherein each packet corresponds to a respective portion of said vehicle message;

wirelessly transmitting a radio-frequency fob signal from said portable RKE fob with a plurality of spaced packet windows having said predetermined duty cycle, each packet window including a respective one of said plurality of packets, wherein said radio-frequency fob signal within each of said packet windows has said predetermined field strength greater than said average field strength limit and a substantially zero field strength between said packet windows, and wherein said predetermined duty cycle results in an actual average field strength for transmitting all of said packets not exceeding said average field strength limit.

11. A vehicle base station in a vehicle for wirelessly transmitting a radio frequency signal to a portable fob, said radio-frequency signal being broadcast within a specified average field strength limit, said station comprising:

a message controller for forming a multi-byte vehicle message, coding said vehicle message into a multi-bit coded message, and framing said multi-bit coded message into a plurality of packets, wherein each packet corresponds to a respective portion of said vehicle message; and a transceiver for wirelessly transmitting said radio-frequency signal from said base station with a plurality of spaced packet windows having a predetermined duty cycle, each packet window including a respective one of said plurality of packets, wherein said radio-frequency signal within each of said packet windows has a predetermined field strength greater than said average field strength limit and a substantially zero field strength between said packet windows, and wherein said predetermined duty cycle results in an actual average field strength for transmitting all of said packets not exceeding said average field strength limit; wherein said transceiver transmits said radio-frequency signal within a specified peak field strength limit which is a predetermined decibel level above said average field strength limit, and said predetermined duty cycle corresponds to said predetermined decibel level; and said predetermined duty cycle has a ratio of one-half of a packet window width to a packet period which is substantially equal to a reciprocal of a ratio of said peak field strength limit to said average field strength limit.

12. The vehicle base station of claim 11 wherein said vehicle message includes data identifying said portable fob for which said vehicle message is intended.

*13. A method of transmitting information from a portable RKE fob to a base station mounted in a vehicle via a radio-frequency signal within a specified average field strength limit, said method comprising:*

*forming a multi-byte fob message;*

*coding said fob message into a multi-bit coded message;*

*framing said multi-bit coded message into a plurality of packets, wherein each packet corresponds to a respective portion of said fob message;*

*wirelessly transmitting said radio-frequency signal from said fob with a plurality of spaced packet windows having a predetermined duty cycle, each packet window including a respective one of said plurality of packets, wherein said radio-frequency signal has within each of said packet windows a predetermined field strength greater than said average field strength limit and has a substantially zero field strength between said packet windows, and wherein said predetermined duty cycle results in an actual average field strength for transmitting all of said packets not exceeding said average field strength limit;*

*receiving said plurality of packets within said base station; and*

*recovering said fob message in response to said received plurality of packets;*

*wherein said radio-frequency signal is transmitted within a specified peak field strength limit which is a predetermined decibel level above said average field strength limit, and wherein said predetermined duty cycle corresponds to said predetermined decibel level; and*

*wherein said predetermined duty cycle has a ratio of transmission on time of a packet window width to a packet period greater than or equal to a reciprocal of a ratio of said peak field strength limit to said average field strength limit.*

*14. A portable fob for wirelessly transmitting a radio-frequency signal to a base station in a vehicle, said radio-frequency signal being broadcast within a specified average field strength limit, said fob comprising:*

*a message controller for forming a multi-byte fob message, coding said fob message into a multi-bit coded message, and framing said multi-bit coded message into a plurality of packets, wherein each packet corresponds to a respective portion of said fob message; and*

*a transceiver for wirelessly transmitting said radio-frequency signal from said fob with a plurality of spaced packet windows having a predetermined duty cycle, each packet window including a respective one of said plurality of packets, wherein said radio-frequency signal has within each of said packet windows a predetermined field strength greater than said average field strength limit and has a substantially zero field strength between said packet windows, and wherein said predetermined duty cycle results in an actual average field strength for transmitting all of said packets not exceeding said average field strength limit;*

*wherein said transceiver transmits said radio-frequency signal within a specified peak field strength limit which is a predetermined decibel level above said average field strength limit, and*

*said predetermined duty cycle corresponds to said predetermined decibel level; and*

*said predetermined duty cycle has a ratio of transmission on time of a packet window width to a packet period greater than or equal to a reciprocal of a ratio of said peak field strength limit to said average field strength limit.*

* * * * *